United States Patent [19]

Labar

[11] 4,258,092
[45] Mar. 24, 1981

[54] LAMINATE WITH REMOVABLE SCORED PAPER BACKING

[75] Inventor: Jacques E. Labar, Braine Le Comte, Belgium

[73] Assignee: Morgan Adhesives Co., Stow, Ohio

[21] Appl. No.: 938,367

[22] Filed: Aug. 31, 1978

[51] Int. Cl.³ .............................................. B32B 3/30
[52] U.S. Cl. ...................................... 428/40; 428/43; 428/167; 428/342; 428/352; 428/404; 428/906
[58] Field of Search ................... 428/43, 40, 41, 42, 428/155, 906, 352, 354, 320, 261, 167, 171, 340, 342, 409; 162/135, 136, 206; 427/207 B, 154; 93/585 T; 56/268, 270, 57

[56] References Cited

U.S. PATENT DOCUMENTS

| | | | |
|---|---|---|---|
| 2,319,272 | 5/1943 | Starr | 428/43 |
| 2,434,545 | 1/1948 | Brady, Jr. et al. | 206/447 |
| 2,681,732 | 6/1954 | Brady | 206/447 |
| 2,999,786 | 9/1961 | Downs et al. | 162/205 |
| 3,362,869 | 1/1968 | Welsh | 162/136 |
| 3,719,548 | 3/1973 | Keck et al. | 156/268 |
| 3,850,786 | 11/1974 | Jeffries | 428/352 |
| 3,859,157 | 1/1975 | Morgan | 428/41 |
| 3,896,246 | 7/1975 | Brady, Jr. | 428/41 |
| 3,900,645 | 8/1975 | Morgan | 428/41 |
| 3,977,310 | 8/1976 | Keck et al. | 93/585 T |
| 3,989,416 | 11/1976 | Louden | 427/361 |
| 4,080,878 | 3/1978 | Gallagher et al. | 425/363 |
| 4,139,416 | 2/1979 | Tapio et al. | 162/206 |

OTHER PUBLICATIONS

E. E. Thomas, Supercalendering of Paper Machine Coated Paper, Paper Trade Journal, pp. 235-237, vol. 122, No. 22.

*Primary Examiner*—Stanley S. Silverman
*Attorney, Agent, or Firm*—Oldham, Oldham, Hudak & Weber Co.

[57] ABSTRACT

A label forming laminate including a face sheet, a layer of pressure sensitive adhesive abutting on one surface of the face sheet, a paper backing layer, and a release layer between an inner face surface of the paper backing layer and the adhesive layer, the paper layer having one machine glazed surface and a clay containing coating on its glazed surface and having score lines formed in its second and outer face surface; the paper backing layer being relatively bulky and uncompressed and having embrittled fibers in its glazed surface.

6 Claims, 5 Drawing Figures

LAMINATE WITH REMOVABLE SCORED PAPER BACKING

BACKGROUND OF THE INVENTION

Heretofore there have been a number of different commercial processes and products developed relating to a pressure sensitive adhesive laminate and to the provision of splitless releasable liner or backing sheets positioned on such laminates.

In one patent on a method of making a paper laminate having appreciably compacted score lines in connection with achieving a splitless release liner or backing, Morgan U.S. Pat. No. 3,859,157, the inventor is concerned about the humidity of the atmosphere surrounding the apparatus when the release liner is compacted. The inventor is concerned about controlling the humidity in the environment when the backing paper has been coated with a release material, dried and then the paper is exposed to humid air and the paper is rehumidified and stabilized at about 50% relative humidity in the air prior to compaction. After compaction is made under these controlled conditions, a face sheet having a layer of pressure sensitive adhesive thereon is laminated onto the release coated surface of the backing paper.

However, it heretofore has been found to be very difficult, if not impossible, to use all desirable types of face layers in making the laminate of U.S. Pat. No. 3,859,157. This is because the adhesive is applied to the face sheet and it is difficult to apply adhesive directly to a metallic or plastic face sheet under the normal state of the art. Irregularities, slipping, distortion of the face sheet, etc. are some of the problems encountered in coating metallic or plastic face sheets with adhesive. Hence, the prior art has taught the concept of coating the release paper with adhesive and transferring this to the face sheet during lamination, but this is not taught or suggested in U.S. Pat. No. 3,859,157.

OTHER PRIOR ART

Keck U.S. Pat. No. 3,719,548 shows processing of clay coated Kraft tag stock of 78 lbs. per ream and it scores this paper on the release coated side in making laminated label stock. The patent also states that strain applied from the opposite side (of the paper) from the release coating often ruptures otherwise suitable release coatings.

U.S. Pat. No. 4,080,878, issued Mar. 28, 1978, is on apparatus for scoring release liners for pressure-sensitive adhesive carrying substrates. The patent states (in referring to the prior art) that a web of liner is first scored and then assembled with adhesive and substrate. It has no details about the type of paper used, and it refers to several prior art patents that have some teaching of the web of a liner being first scored in making up some type of an adhesive carrying laminate. In looking specifically at such reference patents, Starr U.S. Pat. No. 2,319,272 is mentioned and it shows a rubber laminate patch wherein a cover sheet is scored by cutting or the like before or after it is placed in the laminate. Such sheet 16 is made from Holland fabric, cellophane, cellulose, etc. This layer is applied as a temporary cover sheet on a rubber patch and it preferably is provided with a weakened portion in the form of a score line formed by cutting or the like extending across the exposed or outer surface thereof. No teaching of appreciable compaction is present in Starr.

Reference also is made to Brady U.S. Pat. No. 2,434,545 and Brady U.S. Pat. No. 2,681,732. Both of these patents show a scored backing board in an adhesive tape label dispenser unit. These boards are defined as being resilient, but somewhat brittle and they can be made, for example, of sheet vulcanized fiber or resin bonded pulp, etc. Again, no teaching of appreciable compaction is present.

OBJECTS OF THE PRESENT INVENTION

The general object of the present invention is to provide a novel and improved laminate utilizing a special paper therein which is particularly adapted for use in making label type laminates secured in place by pressure sensitive adhesives and having a splitless liner.

Another object of the invention is to provide a clay coated paper stock which is clay coated on only one surface thereof, and which paper has never been subject to any super calendering, crushing, or compacting action whereby the paper fibers therein are of greater porosity than in super calendered paper release liners normally used for pressure sensitive adhesives; and a further object is to use paper having physical properties of a desirable range for use in making label laminates, or the like and wherein the backing paper is ultimately to be stripped from the laminate by bending or cracking the backing along a score line wherein the paper has been appreciably compacted, but not cut, and then manually removing the backing paper from the laminate.

Still another object of the invention is to roll or score a paper release liner by effecting appreciable compaction without cutting to provide an embrittled or stressed linear area therein prior to or after applying any release coating material on the paper, which paper must have a release coating thereon prior to use in any label forming laminate.

The foregoing and other objects and advantages of the present invention will be made more apparent as the specification proceeds.

Reference now is directed to the accompanying drawings, wherein.

When referring to corresponding members shown in the drawings and referred to in the specification, corresponding numerals are used to facilitate comparison therebetween.

It should also be realized that the various layers and laminates in the laminate of the invention are shown of exaggerated size and thickness in the accompanying drawings for clarity and that substantially all of such layers are quite thin, such as from 0.001 inch or less in thickness up to a thickness, for example, of about 0.003 to 0.010 inch for the paper backing layer of the laminate.

Figure 4:
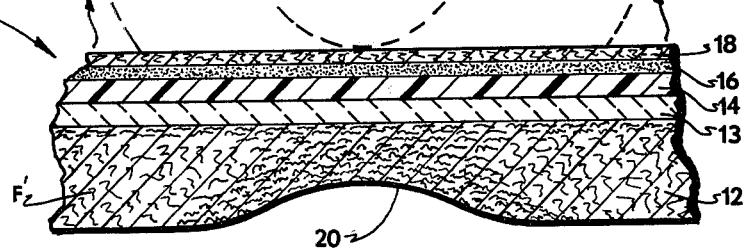
FIG. 4 is a vertical section of the laminate of the invention.

A laminate of the invention, as used in forming labels or the like, is indicated as a whole by the numeral 10 in FIG. 4 and this laminate comprises a pressure sensitive adhesive layer containing laminate wherein a splitless, releasable liner or backing sheet 12 is present and it is of a relatively uncompacted paper with a very smooth coating on one surface thereof as hereinafter described. A layer of a conventional release material 14 is present on the smoothly coated surface. The release layer 14 is in contact with a layer of pressure sensitive adhesive 16 that is of conventional composition and the laminate 10 is completed by a face layer 18 in contact with the adhesive layer 16.

This backing layer 12 is formed of paper having particular specifications and preferably the paper layer 12 has one or more individual surface coatings or layers 13a and 13b applied thereon and suitably dried to provide a very smooth surface on what is the inner face of this paper layer 12. The paper 12 is made with a glazed surface 11 thereon and these clay containing coatings are applied to such glazed surface. Such coatings 13a and 13b are conventional and preferably comprise a mixture of china clay and calcium carbonate carried by and deposited from a latex SBR rubber composition. The paper has been made with a machine glaze on one surface and the two separate covering layers or coatings on the glazed surface insure a complete non-porous substantially uniform covering layer over the glaze. Usually two coats of the clay material are applied but only one coating layer can be used if it results in a uniform and non-porous surface.

In this invention, the physical characteristics of the removable backing paper are very important. Preferably the paper has a machine glaze on one surface thereof and is not calendered or super calendered to obtain surface smoothness. In this regard, it may be helpful to review the procedure in which the two finishes are achieved. The super calender finish is obtained by passing the coated paper between the rolls of a super calender under pressure. A conventional machine calender consists of a series of horizontally positioned cast iron rolls with chilled, hardened surfaces resting one on the other, arranged in a vertical bank. The paper is passed through the nips of the rolls primarily to increase the smoothness and gloss of its surface. A super calender is constructed on the same general principle as a machine calender except that alternate chrome plated cast iron rolls and soft rolls are used in the super calender. The soft rolls are constructed of highly compressed cotton or paper. Super calenders used for coated paper are usually composed of alternate chrome plated and cotton rolls; for uncoated paper the rolls are usually chrome plated and paper rolls. The super calender is not an integral part of the paper machine whereas the machine calender is. In super calendering, the paper is passed through a series of roll nips formed by rolls of different modulii. The pressure and microslip involved at each nip compacts the paper (and hence the smoothness) as well as imparting a glaze or gloss to each side of the paper. Paper is viscoelastic, that is, it exhibits both elastic (recoverable) and plastic flow (nonrecoverable) strain when stressed beyond the proportional limit. As a result of the compressive stress encountered at the super calender, the fiber particularly at the surface has lost some of its strain recovery potential and become more brittle. Thus, the super calendering and subsequent appreciable compaction along a line to effect a score line embrittles the backing paper (through loss of recoverable compressive strain) in the scored area, and the backing paper will crack when back folded, all as taught in U.S. Pat. No. 4,080,878, identified above.

There are many variables associated with super calendering, such as type of fiber, degree of refinement, uniformity of formation, thickness, and supercalender conditions—i.e. moisture content, speed, diameter and composition of rolls, temperature of rolls, etc.

Machine glazed, in contrast, is a finish (produced on one side of the sheet) on a Yankee paper machine or equivalent. A Yankee machine is a paper machine wherein the wet web of paper as it comes from the forming wire or screen is pressed against a large (up to 16 ft. diameter) steam heated, highly polished revolving metal cylinder for drying the sheet instead of many smaller ones. The sheet is pressed with the screen side against the surface of the Yankee drier and may be held in place by a canvas drier felt or belt as the Yankee drier revolves. The screen side of the wet web of paper will tend to have much longer fibers as they have necessarily matted down against the screen to stop and support the shorter fibers to form the web. The wet sheet may be adhered to and dried in intimate contact with the polished drier surface or may have a slight micro slip to give a somewhat tarnished surface. When a properly prepared and formed sheet is so dried, a glaze finish (Machine Glaze—i.e. MG) is produced on the side of the sheet in contact with the polished drier surface. The Yankee machine may have a cylinder or fourdriner wet end and may have any number of auxiliary after driers of the usual type. The surface of the sheet not dried in contact with the polished Yankee drier is rough, reflecting all the variations in basic weight, caliper, etc. as well as the texture of the felt used. The glaze is produced as a result of the bonding of the wet sheet to the polished surface, or the burnishing by micro slip. In drying under these conditions, the surface fibers are drawn tightly to the polished surface by the forces of adhesion developed at the interface between wet web and the polished hot drier surface. Being wet and swollen at the start of the drying process, the surface fibers are easily deformed and therefore are easily pressed and/or drawn to the surface of the polished drier. The process is similar in many ways to the production of high gloss photographic prints made by drying the prints on a ferro plate surface.

The extreme surface fibers of the machine glazed sheet will also exhibit an enhanced brittleness due to the extreme compaction and low allowable strain. Hence, I have found that when the uncompacted machine glazed paper is compacted along a score line in the manner taught for example in U.S. Pat. No. 4,080,878 opposite the glazed surface which compaction in combination with the brittleness at the glazed surface creates a more complete embrittlement through the thickness of the paper and a better or enhanced break or fracture occurs along this line when the paper is bent along the line toward the glazed surface, than when the same process is practiced on a super calendered paper. Apparently the super calendered paper is already somewhat compacted over its entire surface and through its full thickness so that the appreciable compaction caused by the compacting roller of U.S. Pat. No. 4,080,878, for example, does not set up as much of a complete embrittlement along the score line as when the paper is essentially uncompacted except for the glazed surface in the machine glazed paper.

Hence, it is desirable that a smooth coated face be provided on the paper to receive the surface sealing and silicone release coating thereon and that the paper be non-super calendered. Such non-compacted construction or body of the paper permits the paper to be scored, substantially compacted, and/or compressed, to provide break or tear lines in the paper. This paper layer 12, after it is received from the factory, has the desired splitless tear or score lines 20 provided therein and these lines 20 can have any suitable spacing and normally extend the length of the paper laminate 10. The scoring can be made in any conventional manner by use of known means, but it is very important that this scoring provide an appreciably compressed or compacted line in the paper, which scoring may be provided, if desired, by use of known members, such as the apparatus disclosed in U.S. Pat. No. 4,080,878 and wherein the scoring pressure is accurately controlled. The scoring usually is provided by individual rolls in pressure contact with the paper and having the paper pass over a back-up roll as pressure is applied by the scoring roll on the opposite face of the paper from the glazed surface. The amount of pressure applied by the scoring roll may have to be experimentally determined based upon the particular thickness of the paper used and the radius of the blunted roll, but this can be easily determined on the job so that the paper cracks or fractures easily along the score line when bent. In essence, I have found that the pressure is about 10% to 15% less than the amount which will effect a crush or burst cutting of the paper, or an actual fracture be caused by the roller. Under this type of controlled pressure, it is believed that in the machine glazed sheet, the roller will initially compress the paper to about ½ or less of its original thickness but the elasticity of the paper will cause it to spring back or return to between about 80% to 90% of its original thickness. That is, the scoring or indentation remaining in the paper is in the vicinity of 20% of its original thickness. By folding or cracking the laminate toward the face sheet on the score line 20, the paper readily fractures or cracks at such compacted area.

As one good indicia to distinguish machine glazed from super calendered paper, the paper sheet 12 should have a smoothness on the glazed surfaces 13a of the paper layer 12 which is, by the BEKK smoothness test of a minimum of 360; whereas, the BEKK smoothness on the uncoated side of this paper layer 12 is a maximum of 30.

Figure 3A:
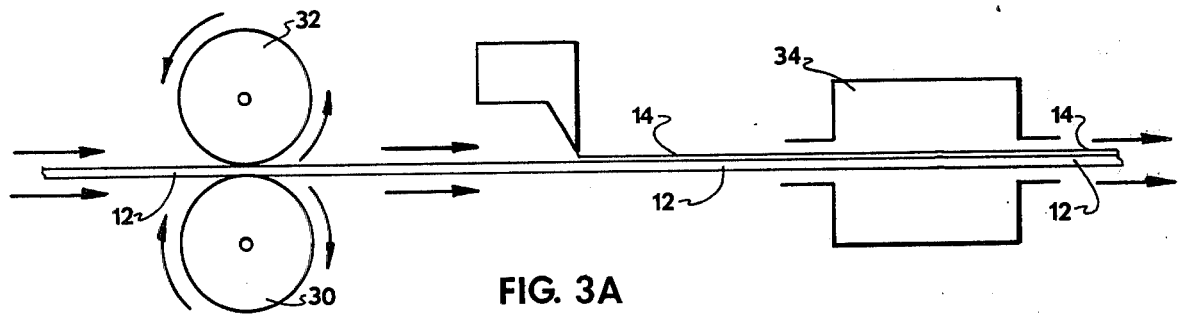
FIGS. 3A and 3B are diagrammatic views showing a method of making the laminate of the invention.
Figure 3B:
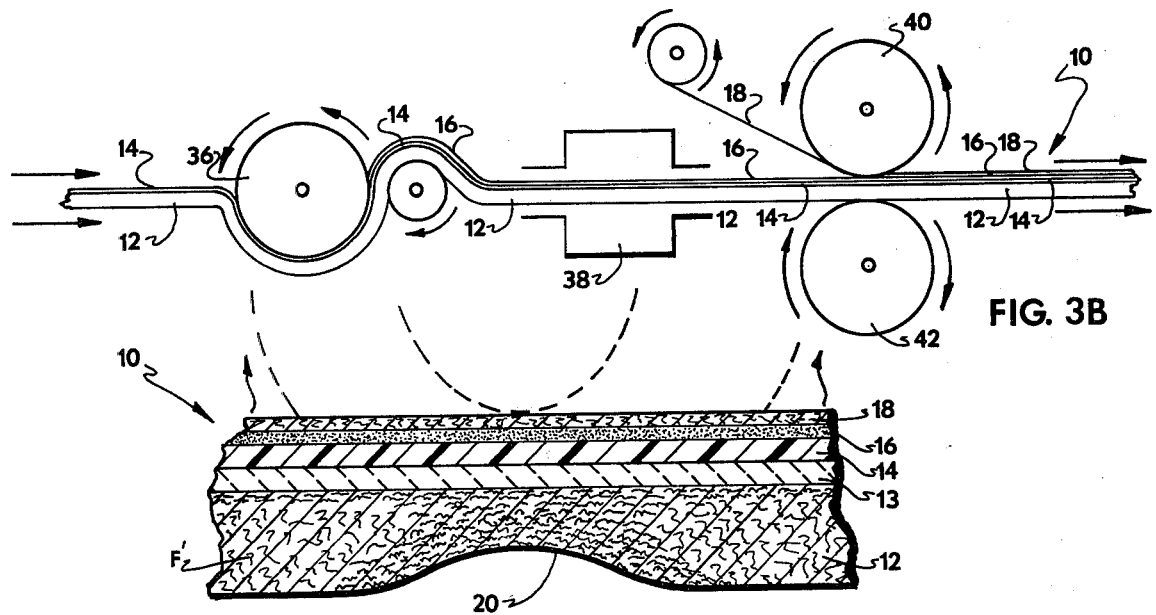

The drawings in FIGS. 3A and 3B show what can be conventional apparatus used for producing a multilayer laminate of the invention. FIG. 3A shows a paper layer 12 as it moves into the apparatus to be scored on one face thereof by a scoring roll 30 while reenforced on its opposite surface by a suitable back-up roll 32 after which a release coating material that forms the ultimate release coating layer 14 in the laminate is applied by a conventional doctor knife or other equipment. Next, the paper moves into a suitable drying oven 34 maintained at an appropriate temperature and being of a length in relation to the speed of movement of the paper 12 to have the release coat dry satisfactorily therein. Or, the paper 12 could be scored after the conventional release coating has been applied thereto and dried.

Next the paper 12 with release coat dried is fed into a suitable adhesive coating unit 36 that applies a layer of liquid adhesive to the paper 12 on the release coated surface thereof. This coated sheet may or may not be dried as for example through a drying oven 38 of appropriate operative characteristics and design as to dry the adhesive coating 16 or render it suitably tacky. Next the adhesive coated release sheet 12 is fed to a pair of laminating rolls 40 and 42 which squeeze the adhesive coated layer of sheet 12 against the face sheet 18 thereby transferring the adhesive layer 16 to the sheet 18 and forming the complete laminate of the invention, as indicated at 10 in FIG. 4.

Other known adhesives may be used, such as hot melt process adhesive or radiation curable adhesives, in place of the pressure sensitive adhesive of layer 16.

Figure 1:
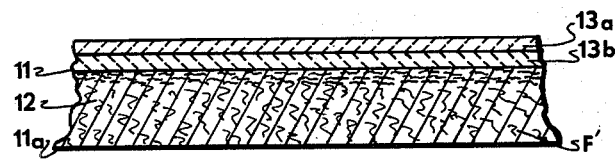
FIG. 1 is a fragmentary vertical section through a paper of the invention used in making a label forming laminate.
Figure 2:
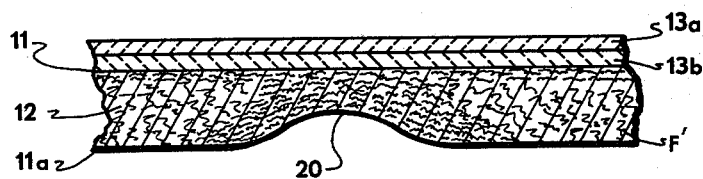
FIG. 2 is an enlarged section of the paper of FIG. 1 after scored lines are formed therein for breaking the splitless paper.

Reference is again made to FIG. 2 that shows that paper fibers F as being compacted and being close together at the surface 11 to form an embrittled area in the paper. Other internal fibers F' in the paper, at the area between the score lines 20 and the surface 11 have, it is believed, been drawn or displaced slightly in such area to be inclined towards the surface 11 and/or have some residual compaction from the scoring action. In other words, the paper is denser at the areas below the score lines 20. The paper layer 12 is porous and is of greater porosity at areas spaced from the machine glazed surface 11 and from the score line 20. The embrittled surface 11 will, it is thought, tear or separate last as the laminate is bent up on itself in the manner indicated in dotted lines in FIG. 4.

Papers which have been used successfully in practice of the invention have the following properties:

| CHARACTERISTICS | | UNITS | PAPER A | PAPER B | PAPER C | PAPER D 80# Kraft |
|---|---|---|---|---|---|---|
| TOTAL WEIGHT | | g/m2 | 90 ± 5 | 108 ± 6 | 138 ± 8 | |
| THICKNESS | | microns | 95 ± 8 | 118 ± 7 | 160 ± 9 | |
| IGT ABSORPTION W 24 (on coated side, machine direction) | | cm | minimum 10.5 | minimum 10.5 | minimum 10.5 | |
| IGT PICK TEST W 31 | | cm/sec | | | | |
| (ND) machine direction | | | minumum 120 | minimum 120 | minimum 120 | |
| (CD) cross direction | | | minimum 100 | minimum 100 | minimum 100 | |
| BEKK SMOOTHNESS | | sec | | | | |
| coated side | | | minimum 360 | minimum 360 | minimum 360 | |
| uncoated side | | | maximum 30 | maximum 30 | maximum 30 | |
| TABER STIFFNESS → | MD | g . cm | minimum 2.3 | minimum 4.0 | minimum 8.0 | |
| | CD | | minimum 1.3 | minimum 0.2 | minimum 4.0 | |
| TENSILE STRENGTH → | MD | kg | minimum 7.5 | minimum 9.0 | minimum 11.0 | |
| | CD | | minimum 4.0 | minimum 4.5 | minimum 6.0 | |
| TEAR STRENGTH (ELMENDORF) | MD | g | minimum 60 | minimum 70 | minimum 140 | |
| | CD | | minimum 70 | minimum 85 | minimum 150 | |
| lb./ream Total Weight (3000 ft.$^2$ ream) | | | 55 ± 3 | 66 ± 4 | 87 ± 5 | 75 ± 4 |
| mils Thickness | | | 3.7 ± 0.3 | 4.6 ± 0.3 | 6.3 ± 0.4 | 4.5 ± 0.3 |
| mils/lb/ream (bulk density) | | | .0673 | .0697 | .0724 | .0600 |

The coating weights normally amount to 7 to 8 g/m$^2$ for each layer.

The BEKK smoothness of the papers on their glazed surfaces prior to clay coating the same was:

| Paper A | 80-10 |
|---|---|
| Paper B | 95-100 |
| Paper C | 60-70 |

In comparing the bulk density of super calendered paper with the machine glazed papers of the invention, the typical commercial 80# Kraft paper cited for comparison as Example D, it is seen from the foregoing table that Paper A is about 12% different or more bulky less compacted than the commercial paper $$\frac{(.0673 - .0600)}{.0600}$$

and paper C, for example, about 20.7% more bulky.

Improved laminates and products therefrom that are easy to strip and use have been provided by the invention whereby the objects thereof have been achieved.

While one complete embodiment of the invention has been disclosed herein, it will be appreciated that modification of this particular embodiment of the invention may be resorted to without departing from the scope of the invention.

What is claimed is:

1. A laminate for use in making a label or the like and comprising a face sheet, a layer of pressure sensitive adhesive in contact with one surface of said face sheet, a fibrous paper backing layer, and a release layer between one face of said paper backing layer and one surface of said adhesive layer and where said lamainate is characterized by said paper layer having a clay containing coating on its said one face and having appreciably compacted score lines formed in its second and porous outer face, said one face of said paper backing layer having a machine glazed surface, said clay containing coating being relatively uniform and non-porous, said paper backing layer having a BEKK smoothness on its said coated one face of a minimum of about 360 and having a maximum BEKK smoothness on its uncoated face of about 30, said paper backing layer being uncompressed, and said paper backing layer of a given weight having more bulk per unit of basic weight than a super calendered paper of the same basic weight.

2. A laminate as in claim 1 where the paper layer has at least 10% more bulk than super calendered papers.

3. A laminate for use in making a label or the like and comprising a face sheet, a layer of pressure sensitive adhesive next to one surface of said face sheet, a fibrous paper backing layer and a release layer between one face surface paper backing layer and a release layer between one face surface of said paper backing layer and one surface of said adhesive layer and where said laminate is characterized by said paper layer having one machine glazed surface and a clay containing coating on its said glazed surface and having score lines formed in its second and outer face surface; said paper backing layer being relatively bulky, porous and uncompressed the paper in the paper layer at the score line being appreciably compacted to embrittlement, said paper backing layer of a given weight having more bulk per unit of basic weight than a super calendered paper of the same basic weight.

4. A laminate as in claim 3 where said paper backing layer is porous throughout except for its coated machine glazed surface, said paper backing layer having a noticeably rougher outer face surface than its machine glazed surface.

5. A laminate as in claim 3 or 4 where said paper backing layer has a BEKK smoothness on its machine glazed clay coated surface of about 360 and a BEKK smoothness of about 30 on its second and outer face.

6. A laminate as in claim 3 where the paper in said paper layer has at least 10% more bulk than super calendered paper.

* * * * *